United States Patent

Maurukas

[15] 3,644,274

[45] Feb. 22, 1972

[54] FURAN NO-BAKE FOUNDRY BINDERS

[72] Inventor: Frank A. Maurukas, Cicero, Ill.

[73] Assignee: CPC International Inc.

[22] Filed: Dec. 22, 1969

[21] Appl. No.: 887,367

[52] U.S. Cl. ..................260/41 A, 260/37 R, 260/DIG. 40
[51] Int. Cl. .........................................................C08f 45/04
[58] Field of Search....................260/41 A, 88.5, DIG. 40; 164/43

[56] References Cited

UNITED STATES PATENTS

| | | | |
|---|---|---|---|
| 2,768,408 | 10/1956 | Strigle et al. | 260/88.5 X |
| 2,818,620 | 1/1958 | Moore | 164/43 |
| 3,024,215 | 3/1962 | Freeman et al. | 260/DIG. 40 |

FOREIGN PATENTS OR APPLICATIONS 897,609   5/1962   Great Britain...........................164/43

Primary Examiner—Morris Liebman
Assistant Examiner—L. T. Jacobs
Attorney—Frank E. Robbins, Joseph Shekleton, Janet E. Price, Robert D. Weist, Martha A. Michaels and Dorothy R. Thumler

[57] ABSTRACT

Describes a process for the acid-catalyzed polymerization of a fusible furan resin, by incorporating a source of fluoride ion in the acid catalyst. Also covers the process for forming foundry cores or molds from sand using a fusible furan resin binder and an acid catalyst that contains a source of fluoride ion.

13 Claims, No Drawings

FURAN NO-BAKE FOUNDRY BINDERS

This invention relates to improved processes for curing fusible furan resins and, in particular, to processes for forming foundry cores and molds from sand through the use of fusible furan resin binders.

Furan binders have been used in the foundry industry for several years. The furan resins that are used for foundry binders are usually prepared from reacting furfuryl alcohol with urea-formaldehyde resins, or with formaldehyde, in order to obtain low-viscosity, soluble, fusible, furan resins. In some cases, phenolic resins or other modifiers are added to the furan resins.

By stopping the initial reaction mentioned above at a point where the resin product remains fusible, the product that is obtained is capable of being polymerized further either alone or in reaction with other reactive resins. Final curing, to the infusible state, can be obtained by the use of an acid catalyst.

Foundry cores and molds have been prepared from sand that is coated with furan resin binders in the following way. First, the sand is wetted with a strong acid. One preferred kind of acid is concentrated phosphoric acid, generally at 75 to 85 percent concentration. A low-viscosity, fusible furan resin is then applied to the moist sand. The resin is applied in liquid form, that is, either the resin is liquid or it is applied in the form of a solution. Generally from about 0.5 percent to about 10 percent, and more preferably from about 1 to about 2.5 percent resin, is applied to the sand based on the weight of the sand. The amount of acid catalyst employed is generally from about 20 to about 55 percent by weight of the resin.

Since the acid catalyzes the curing of the resin at room temperature, the foundry cores and molds prepared by this kind of process are generally described as having been prepared by the use of a no-bake resin. The advantages of room temperature curing, as compared to high temperature cures used for some other resinous binders, are obvious. Furan resin binders produce strong, hard, well-cured cores and molds within a few hours.

Although the use of furan resin binders offers many advantages, there are also some disadvantages. One important disadvantage is that the cured cores or molds often suffer a substantial loss in strength when stores for any length of time under conditions of relatively high humidity. This loss in strength may lead to undesirable breakage when such aged cores are handled. Secondly, when concentrated phosphoric acid is employed as the acid catalyst, some inconvenience may occur because of the tendency of concentrated phosphoric acid to solidify at room temperature.

Another important disadvantage of conventional furan resin binders is that they can be used effectively only with low acid demand sands such as, for example, washed and dried silica sands. There are many lake and bank sands that contain lime, clay, and other alkaline materials, that cannot be used with the usual furan resin binder systems, because the presence of the alkaline materials prevents proper curing of the resin because the acid is consumed in side reactions with the alkaline materials.

Still another disadvantage, that can be observed in cores and molds prepared with furan resin binders, is that the cores and molds often have low scratch hardness when cured with phosphoric acid. This increases the probability that casting defects will occur.

One object of the present invention is to provide a new and improved process for the effective polymerization of low-viscosity furan resins.

A more specific object of the invention is to provide a new and practical process for the production of foundry cores or molds that can be cured at room temperature, which process will be improved with respect to the prior art, as to the disadvantages previously mentioned.

Other objects of the invention will be apparent from the specification that follows and from the recitals of the appended claims.

GENERAL DESCRIPTION

A new and practical process for the production of foundry cores and molds that has now been discovered. This process is based upon the use with the acid catalyst of a source of a fluoride ion.

Generally speaking, the practice of the process of the invention follows the prior art practices with the exception that the source of fluoride ion is used along with the acid catalyst.

The source of the fluoride ion may be hydrogen fluoride boron trifluoride or complexes thereof, fluosilicic acid, antimony trifluoride, antimony pentafluoride, fluoroboric acid, sodium fluoride, calcium fluoride, potassium fluoroborate, and the like. The boron trifluoride complexes that can be used include boron trifluoride etherate complexes, boron trifluoride urea complexes, boron trifluoride alcohol complexes, boron trifluoride phenol complexes, and the boron trifluoride water complex. While these sources of fluoride ion that have been mentioned include those that are readily available and useful, other sources of fluoride ion can be expected to provide the same results. The preferred sources of fluoride ion are hydrofluoric acid, boron trifluoride, and the boron trifluoride water complex.

The acids that can be used as catalysts are those ordinarily used for the purpose. For clarity, the acid catalyst is hereafter referred to as the acid component of the catalyst, since the present invention utilizes as the catalyst not only the usual acid but also the source of fluoride ion (which may also be an acid).

The acids that are useful as the acid component include, for example, such acids as: hydrochloric, phosphoric, sulfuric, benzoic, boric, trifluoracetic, p-toluene sulfonic acid, and mixtures thereof.

Generally, the source of fluoride ion will lead to the desired improved results when it is used along with the acid component of the catalyst in an amount from about 1 to about 30 percent based on the total weight of the catalyst, that is, the weight of the acid component of the catalyst per se plus the weight of the source of the fluoride ion. The amount of fluoride ion source that is to be used for good or optimum results depends upon the particular acid component that is employed and upon the type of sand that is used to make a foundry core. When hydrofluoric acid is employed as the fluoride ion source, the preferred range of use is an amount that forms from about 1 to about 5 percent by weight of the total weight of the catalyst (including the hydrofluoric acid).

To use a source of fluoride ion in accordance with the present invention, the material selected as the source of the fluoride ion preferably is simply mixed with the acid that is selected for use as the catalyst, until a homogeneous mixture is obtained. In some cases, it may be necessary to heat the mixture in order to obtain solution of the fluoride ion source in the acid, particularly when one of the relatively insoluble boron trifluoride complexes is employed as the source of fluoride ion.

However, the particular manner of bringing together the fluoride ion source and acid component is not material, so long as they can act together to cause polymerization of the resin. Thus, according to another mode of practicing the invention, the fluoride ion source such as, for example, sodium fluoride, calcium fluoride, or potassium fluoroborate is mixed with the sand. The subsequent addition of the acid component makes the fluoride ion available as a part of the catalyst.

Especially preferred catalyst mixtures, that is, mixtures of an acid component and a source of fluoride ion, are exemplified as follows:

a. from about 0.85 to about 1.1 moles of phosphoric acid, from about 0.02 to about 0.4 moles of hydrofluoric acid, and from about 0.5 to about 2.0 moles of water;

b. from about 0.85 moles to about 1.1 moles of phosphoric acid from about 0.02 to about 0.3 moles of boron trifluoride or one of its complexes, and from about 0.5 moles to about 2.0 moles of water;

c. from about 0.05 to about 0.3 of sulfuric acid, from about 0.50 to about 0.80 moles of phosphoric acid, from about 0.02 to about 0.4 moles of hydrofluoric acid, and from about 0.5 moles to about 2.0 moles of water;

d. from about 0.35 to about 0.55 moles of paratoluene sulfonic acid, from about 0.02 to about 0.4 moles of hydrofluoric acid or boron trifluoride, and from about 0.02 to about 2.5 moles of water.

The sands that can be used in practicing the present invention include all types of silica sands. This includes washed and dried silica sands of low acid demand and, as well, lake and bank sands having acid demands as high as 60. Other refractory particulate materials such as, for example, chromite sand and aluminum silicate may also be used.

EXAMPLES

The invention will be now further described by reference to several detailed specific examples thereof. All parts and percentages are by weight unless expressly stated to be otherwise.

EXAMPLE 1

Two different, commercially available furan resin binders were selected for evaluation. Both of these resin binders were prepared by reacting furfuryl alcohol, urea, and formaldehyde. These resins are identified as resins A and B, respectively, in Table I below, which lists their properties.

TABLE I

| Resin | Viscosity | Refractive Index | % Nitrogen | % Water |
|-------|-----------|------------------|------------|---------|
| A | 50 cps. | 1.494 | 4.8 | 16.5 |
| B | 60 cps. | 1.502 | 5.5 | 10.0 |

To evaluate the advantages of the present invention, cores were prepared in the following manner. Catalyst mixtures were prepared as identified in Table II, below. Cores were then prepared by mulling 35 g. of each of the catalysts listed in Table II with 5,000 g. of commercially available washed and dried silica sand for 3 minutes. Then 100 g. of the resin binder was added and mulling was continued for 2 minutes. The coated sand was then jolted into core boxes.

The cores were allowed to cure in their boxes, and were stripped when a reading of 25 p.s.i. was obtained on a mold strength tester. After stripping, the mold strength was determined by American Foundry Society test methods.

At intervals of two hours and 24 hours respectively after stripping, the scratch hardness of the cores was determined with a hardness tester. The higher the scratch hardness, the better the cores are. Tensile strength measurements were made at different time intervals.

The observations obtained are recorded below in Table II:

TABLE II

| Resin | Catalyst mixture | Mold strength, p.s.i. | Strip time, min. | Stratch hardness 2 hrs. | Stratch hardness 24 hrs. | Tensile strength, p.s.i. 2 hrs. | Tensile strength, p.s.i. 24 hrs. |
|-------|------------------|------------------------|-------------------|--------------------------|---------------------------|----------------------------------|-----------------------------------|
| A | 85% H₃PO₄ (control) | 10 | 22 | 90 | 93 | 80 | 206 |
| A | 98% of 85% H₃PO₄; 2% of 53% HF | 12 | 20 | 92 | 95 | 134 | 276 |
| B | 85% of H₃PO₄ (control) | 10 | 18 | 65 | 70 | 52.5 | 72 |
| B | 97% of 85% H₃PO₄; 3% of 53% HF | 20 | 18 | 90 | 95 | 120 | 250 |
| B | 94% of 85% H₃PO₄; 6% of 53% HF | 20 | 16 | 90 | 95 | 185 | 240 |
| B | 97.5% of 85% H₃PO₄; 2.5% of BF₃ etherate | 18 | 18 | 90 | 90 | 190 | 195 |
| B | 95% of 85% H₃PO₄; 5% of BF₃ etherate | 18 | 15 | 95 | 95 | 195 | 195 |

EXAMPLE 2

Use of High Acid Demand Sands

This example demonstrates the usefulness of catalyst mixtures, prepared in accordance with the present invention, with high acid demand sands.

A catalyst mixture was prepared by mixing together 14 parts of boron trifluoride etherate and 86 parts of 85 percent phosphoric acid. 5,000 g. of a lake sand, having an acid demand of 24, was then placed in a muller together with 35 g. of the catalyst mixture. Mulling was continued for 2 minutes, then 75 g. of resin A was added and mulling was continued for 1 minute more. Cores were then prepared by jolting the coated sand into core boxes.

The cores that were produced had a strip time of 20 minutes, mold strength on stripping of 23 p.s.i., and a scratch hardness of 90 after 24 hours.

By way of comparison, when the same procedure was followed except that the catalyst consisted of 35 parts of 85 percent phosphoric acid, the cores did not cure at all.

EXAMPLE 3

Use of Other Catalysts and Sands

For this example, a commercially available resin binder was employed. It was a soluble, fusible furan resin prepared by reacting furfuryl alcohol, urea, and formaldehyde. The resin had the following properties:

TABLE III

| Resin | Viscosity | Refractive Index | % Nitrogen | % Water |
|-------|-----------|------------------|------------|---------|
| C | 55 cps. | 1.510 | 4.8 | 9.0 |

A catalyst mixture was prepared from 60 parts of 85 percent phosphoric acid, 25 parts of 90 percent sulfuric acid, 5 parts of 53 percent aqueous hydrofluoric acid, and 10 parts of water (referred to hereafter as Ex. 3 mixture).

This catalyst mixture was then evaluated by using it in the preparation of cores from a lake sand, a bank sand, and a washed and dried silica sand. For comparative purposes, similar cores were prepared using 85 percent phosphoric acid as the acid catalyst. The lake sand employed had an acid demand of 24, the bank sand an acid demand of 18, and the washed silica sand an acid demand of 3.

The cores were prepared by following the procedure described in Example 2. The results observed are recorded below in Table IV:

TABLE IV

| Sand | Catalyst | Strip time, min. | Mold strength | Scratch hardness, 2 hrs. | Tensile strength, 2 hrs., p.s.i. |
|------|----------|-------------------|---------------|---------------------------|----------------------------------|
| Lake | 85% H₃PO₄ | None | Cores would not cure | | |
| Lake | Ex. 3 mixture | 25 | 17 | 90 | 160 |
| Bank | 85% H₃PO₄ | 68 | 2 | *0 | |
| Bank | Ex. 3 mixture | 16 | 19 | 90 | 260 |
| Silica | 85% H₃PO₄ | 30 | 10 | 90 | 210 |
| Silica | Ex. 3 mixture | 20 | 10 | 93 | 340 |

*Scratch hardness could not be measured because the cores collapsed on removal from the core box.

These data demonstrate the advantages of the process of the present invention. In many cases, cores can be prepared that could not be prepared at all by prior art practices. In addition, superior properties are obtained in terms of strip time, mold strength, scratch hardness and tensile strength.

ADVANTAGES OF THE INVENTION

Generally, the practice of the present invention affords several distinct and highly desirable advantages. In most cases the disadvantages that characterize the prior art processes are either eliminated or substantially minimized.

The practice of the present invention leads to the production of cores and molds having a greater depth of cure than is the case when the acid catalyst is an acid, such as phosphoric acid, alone. In addition, molds, cores, and other articles that are prepared from furan resin binders that are rendered infusible with catalyst mixtures of the present invention retain strength even when stored at high humidities over long periods of time.

In addition to producing articles of higher tensile strength, greater scratch hardness, and with more rapid curing time, the practice of the present invention has the important practical and economic advantage of working well with both low and high acid demand sands. This offers important economies to those foundries that have local inexpensive sands available. By way of contrast, when a conventional acid catalyst, such as phosphoric acid, is used as the acid catalyst, only high quality, low acid demand sands can be used, and for some foundries, this may involve freight charges for long distance shipments.

Still another important advantage of the present invention is that soluble, fusible furan resins can be rendered infusible by the use of a smaller amount of catalyst mixture than would be required were a conventional acid catalyst, such as phosphoric acid, employed.

A further advantage of the preferred catalyst mixtures of the present invention, such as for example, a mixture of phosphoric acid, sulfuric acid, and hydrofluoric acid, is that the catalyst mixture functions as though an inhibitor were present. This phenomenon is manifested by the marked decrease that is observed in corrosion. This is a most unexpected result.

CONCLUSION

While the invention has been described in connection with the production of foundry cores and molds, it can be applied to the production of shaped articles of any kind. Acid catalyst mixtures prepared in accordance with the present invention are useful generally in connection with rendering soluble, fusible furan resins, infusible at room temperature. The process of the invention is generally applicable to furan resins, including alkaline-catalyzed resins, since the acidic catalyst neutralizes any alkali that is present.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention.

I claim:

1. A process for forming a foundry core or mold from sand comprising:
   coating the sand with an acid catalyst component together with a source of a fluoride ion that is soluble in the acid catalyst component;
   applying a fusible furan resin binder to the sand; forming the sand into a desired shape, and permitting the resin to cure.

2. A process in accordance with claim 4 wherein the proportions of materials used, by weight, are:

| furan resin binder | 0.5 to 10% based on the sand |
| --- | --- |
| acid catalyst component | 20 to 55% based on the resin binder. |

3. A process in accordance with claim 2 wherein the source of fluoride ion is hydrofluoric acid that is present in an amount so as to form from about 1 to about 5 percent by weight of the catalyst.

4. A process in accordance with claim 2 wherein the amount of furan resin binder is present in the range from about 1 to about 2.5 percent by weight based on the sand.

5. A process in accordance with claim 2 wherein the resin comprises the acid-catalyzed reaction product of furfuryl alcohol, urea, and formaldehyde.

6. A process for forming a foundry core or mold from sand comprising:
   coating the sand with an acid catalyst component that is selected from the group consisting of hydrochloric, phosphoric, sulfuric, benzoic, boric, trifluoroacetic and paratoluene sulfonic acids, and mixtures thereof and with a source of fluoride ion that is dissolved in the acid catalyst component;
   applying a fusible furan resin binder to the sand, said binder comprising the acid-catalyzed reaction product of furfuryl alcohol, urea, and formaldehyde;
   forming the coated sand to a desired shape, and permitting the resin binder to cure.

7. A process in accordance with claim 6 wherein the source of fluoride ion is selected from the group consisting of hydrofluoric acid, fluosilicic acid, boron trifluoride and complexes thereof, antimony trifluoride, antimony pentafluoride, fluoroboric acid, sodium fluoride, calcium fluoride, potassium fluoroborate, and mixtures thereof.

8. A process in accordance with claim 7 wherein the proportions of materials used, by weight, are:

| furan resin binder | 0.5 to 10% based on the sand |
| --- | --- |
| acid catalyst component | 20% to 55% based on the resin binder |

9. A process in accordance with claim 8 wherein the amount of furan resin binder is in the range of from about 1 to about 2.5 percent by weight based on the sand, and the source of the fluoride ion is hydrofluoric acid that is present in an amount so as to form from about 1 to about 5 percent by weight of the acid catalyst component.

10. A process in accordance with claim 9 wherein the acid catalyst component is phosphoric acid.

11. A foundry core or mold prepared in accordance with the process of claim 1.

12. A foundry core or mold prepared in accordance with the process of claim 4.

13. A foundry core or mold prepared in accordance with the process of claim 6.

* * * * *

UNITED STATES PATENT AND TRADEMARK OFFICE
CERTIFICATE OF CORRECTION

PATENT NO. : 3644274
DATED : February 22, 1972
INVENTOR(S) : Frank A. Maurukas

It is certified that error appears in the above-identified patent and that said Letters Patent are hereby corrected as shown below:

Column 6, Line 4, the numeral "4" should read ---1---.

Signed and Sealed this

Third Day of October 1978

[SEAL]

Attest:

RUTH C. MASON
Attesting Officer

DONALD W. BANNER
Commissioner of Patents and Trademarks